(12) United States Patent
Arentzen

(10) Patent No.: US 6,945,576 B1
(45) Date of Patent: Sep. 20, 2005

(54) MULTIFUNCTIONAL BUMPER ASSEMBLY

(75) Inventor: Otto T. Arentzen, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/830,945

(22) Filed: Apr. 23, 2004

(51) Int. Cl.[7] .............................................. B60R 19/48
(52) U.S. Cl. ........................ 293/117; 296/208; 180/68.3
(58) Field of Search ........................ 293/117, 113, 115, 293/106, 122; 296/193.1, 208; 180/68.1, 180/68.3

(56) References Cited

U.S. PATENT DOCUMENTS

| | | | | |
|---|---|---|---|---|
| 4,653,788 A | * | 3/1987 | Di Giusto | 293/117 |
| 4,902,059 A | * | 2/1990 | Tritton | 293/117 |
| 5,141,068 A | * | 8/1992 | Mendicino | 180/68.3 |
| 5,172,656 A | * | 12/1992 | Wright | 123/41.01 |
| 5,460,420 A | * | 10/1995 | Perkins et al. | 293/106 |
| 5,860,685 A | * | 1/1999 | Horney et al. | 293/113 |
| 5,979,953 A | * | 11/1999 | Rinehart | 293/106 |

FOREIGN PATENT DOCUMENTS

| | | | | |
|---|---|---|---|---|
| JP | 02009940 A | * | 1/1990 | F02M 35/16 |
| JP | 02241824 A | * | 9/1990 | B60K 13/02 |

OTHER PUBLICATIONS

English Abstract of JP 02241824A.*

* cited by examiner

*Primary Examiner*—Patricia L. Engle
(74) *Attorney, Agent, or Firm*—Karl F. Barr, Jr.

(57) ABSTRACT

A multifunctional bumper assembly, for use with a vehicle, which provides energy absorption structure as well as an air intake assembly housed within the interior of the bumper assembly to increase engine compartment space. The bumper assembly has an elongated wall having a generally C-shaped cross section internally defining a channel housing the air intake assembly. The air intake assembly includes an elongated duct having inlet and outlet ends and a housing for an intake air filter element connected intermediate the ends for filtering air drawn in through the inlet end and discharged through the outlet end to an engine air intake.

21 Claims, 4 Drawing Sheets

MULTIFUNCTIONAL BUMPER ASSEMBLY

TECHNICAL FIELD

This invention relates to automotive bumpers and, more particularly, to multifunctional bumpers having integral air intake assemblies for supplying filtered intake air to an engine intake manifold.

BACKGROUND OF THE INVENTION

Automotive bumpers are commonly formed having a smooth exterior wall defining an interior space filled with energy-absorbing material or having internal energy-absorbing structures to absorb collision energy.

Air intake assemblies are commonly fitted in an engine compartment of a vehicle to supply filtered intake air to an engine for combustion. Consequently, the air intake assembly utilizes a portion of the available engine compartment space.

SUMMARY OF THE INVENTION

The present invention provides a multifunctional bumper assembly for use with an automotive vehicle. The bumper assembly provides energy absorption means as well as an air intake assembly housed within the interior of the bumper assembly. The invention frees up engine compartment space for other uses or improved engine access. Reduced heating of the engine intake air may also result.

In an exemplary embodiment, the bumper assembly is formed of any suitable materials such as plastic, fiberglass, carbon fiber or metal. The bumper assembly has an elongated wall having a generally C-shaped cross section internally defining a channel. The interior channel is provided with mounts for fastening the bumper assembly laterally across an end of the vehicle. Unused space within and behind the channel, may be filled with energy absorbing materials such as Styrofoam or structural ribbing to provide energy-absorbing characteristics for the bumper assembly.

An air intake assembly extends lengthwise within the channel. The air intake assembly includes an elongated duct, which may be harmonically tuned, having inlet and outlet ends. An intake air filter is connected intermediate the ends of the duct for filtering air drawn in through the inlet end and discharged through the outlet end to an engine air intake.

In an alternative embodiment, a similar bumper assembly includes an elongated inner mounting member supporting the elongated wall and air intake assembly and adapted to mount the bumper assembly to a vehicle. The air intake assembly, extending lengthwise between the elongated wall and the inner mounting member, may be attached to the mounting member or retained within the channel of the elongated wall.

An access opening is preferably provided in either of the bumper assembly embodiments, which opens though the elongated wall of the bumper assembly for maintenance of the intake assembly and the air filter. An access panel may be removably, pivotally or slidably attached to the elongated wall of the bumper assembly to provide a cover over the access opening. The panel may also have an outward facing surface adapted for holding and displaying a license plate on the exterior of the bumper assembly.

If desired, a ram-air intake port may be provided in a forward facing elongated front wall to admit inlet air to the duct and to provide ram-air induction to the air intake assembly. To prevent water intrusion into the air intake assembly, the ram-air intake port may have baffles to deflect water and debris away from the inlet of the duct. In addition, the duct may be provided with drain holes before the air filter to reduce water intrusion to the air filter.

It should be understood that the air intake assembly may be designed to provide additional energy-absorbing structure within the interior of the bumper assembly.

These and other features and advantages of the invention will be more fully understood from the following description of certain specific embodiments of the invention taken together with the accompanying drawings.

DESCRIPTION OF THE PREFERRED EMBODIMENT

Figure 1:
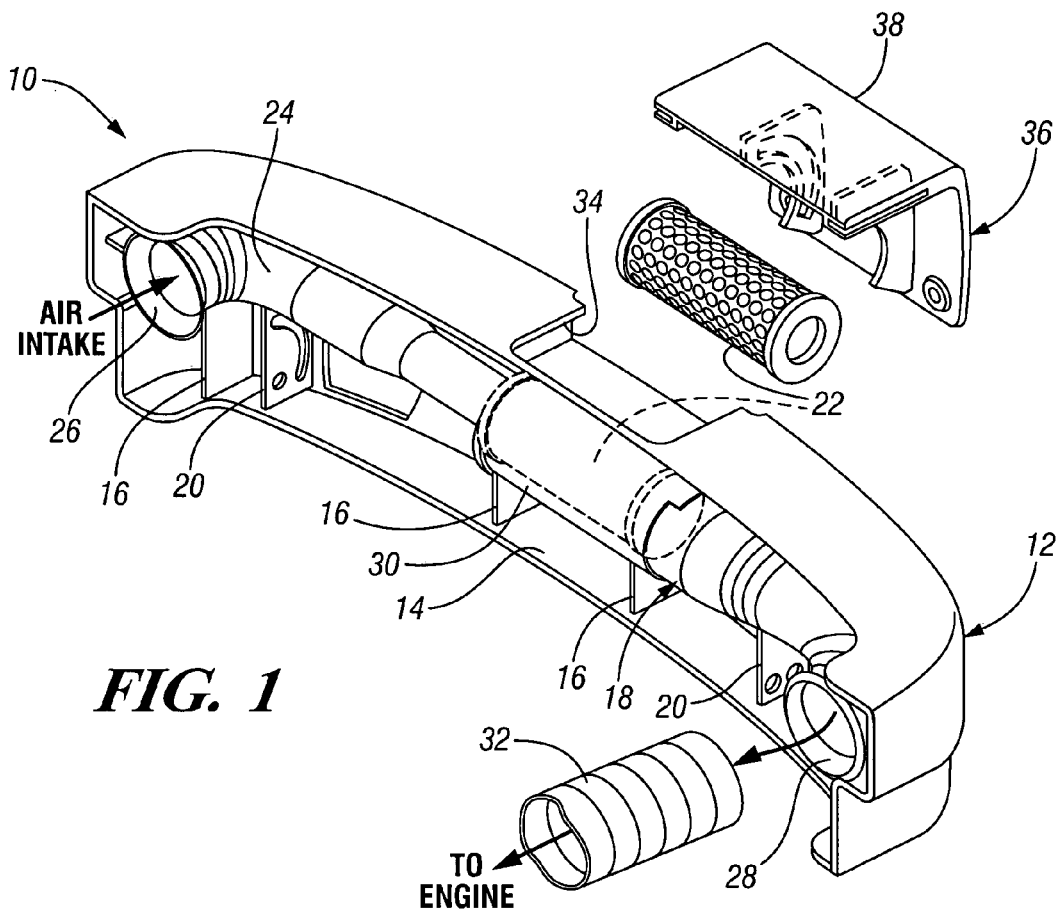
FIG. 1 is an exploded rear pictorial view of an automotive bumper assembly according to the present invention.
Figure 2:
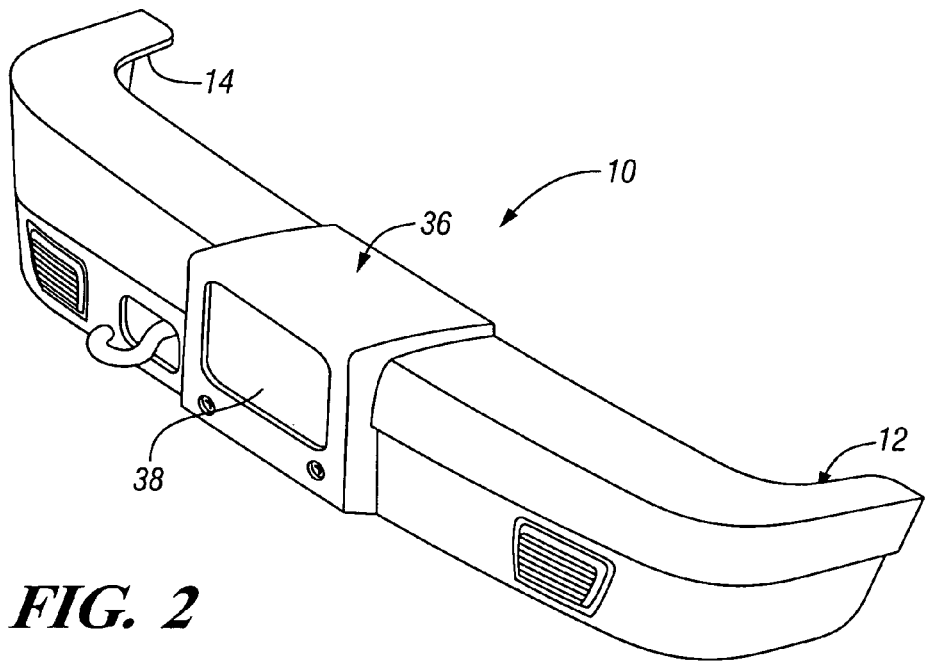
FIG. 2 is a front pictorial view of the bumper assembly of FIG. 1.

Referring first to FIGS. 1 and 2 of the drawings in detail, numeral 10 generally indicates an automotive front bumper assembly according to the invention. The bumper assembly 10 has an elongated front wall 12, formed of plastic or other suitable materials such as fiberglass, carbon fiber or metal. The front wall 12 has a generally C-shaped cross section internally defining a longitudinally extending channel 14 including ribs 16 retaining an air intake assembly 18. The channel 14 also includes mounts 20 adapted for mounting the bumper assembly to an automotive frame. The channel 14 may also be provided with additional ribbing or other suitable structures or materials, not shown, to supplement the ribs 16 in providing energy absorption for the bumper assembly.

The air intake assembly 18 within the channel 14 includes a replaceable filter element 22 mounted within an elongated duct 24 having inlet and outlet ends 26, 28 and an intake air filter housing 30 connected intermediate the ends. Housing 30 internally mounts the replaceable filter element 22 for filtering air drawn through the inlet end and discharged through the outlet end to an engine air intake 32. The air intake assembly 18 may be harmonically tuned to resonate at a desired frequency specific for any make and model of car or truck.

Figure 3:
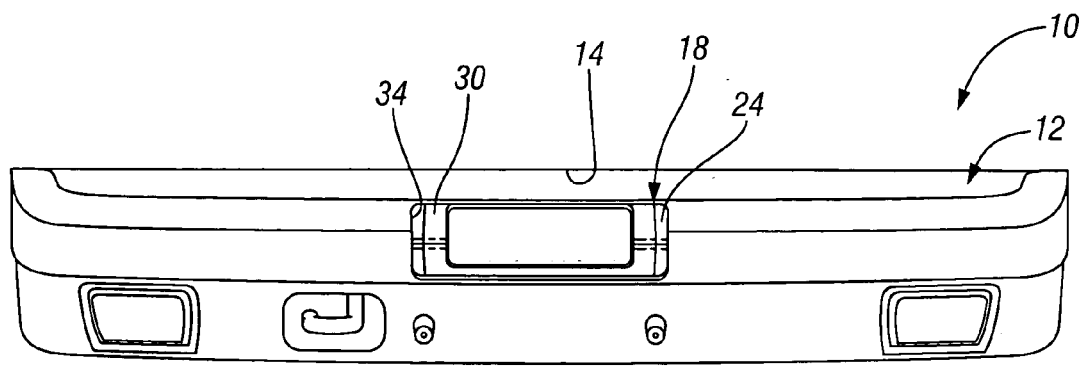
FIG. 3 is a front elevational view with the access panel and filter cartridge removed.

Referring now to FIGS. 1–3, an access opening 34 extends through the elongated front wall 12 of the bumper assembly 10 to provide access to the air filter element 22 and the air intake assembly 18. An access panel 36 covers the access opening 34 to protect the air intake assembly 18 during vehicle operation. The access panel 36 may be removably, pivotally or slidably attached to the elongated front wall 12 of the bumper assembly 10 to provide an openable or removable closure over the access opening 34. In addition, the panel 36 may have an exterior surface 38 adapted for mounting and displaying a license plate on the bumper assembly 10.

After the bumper assembly 10 is assembled by fastening the air intake 18 into the channel 14, the outlet 28 of the duct 24 is connected with the engine air intake 32 and the mounts 20 of the bumper assembly are fastened to a vehicle.

Figure 4:
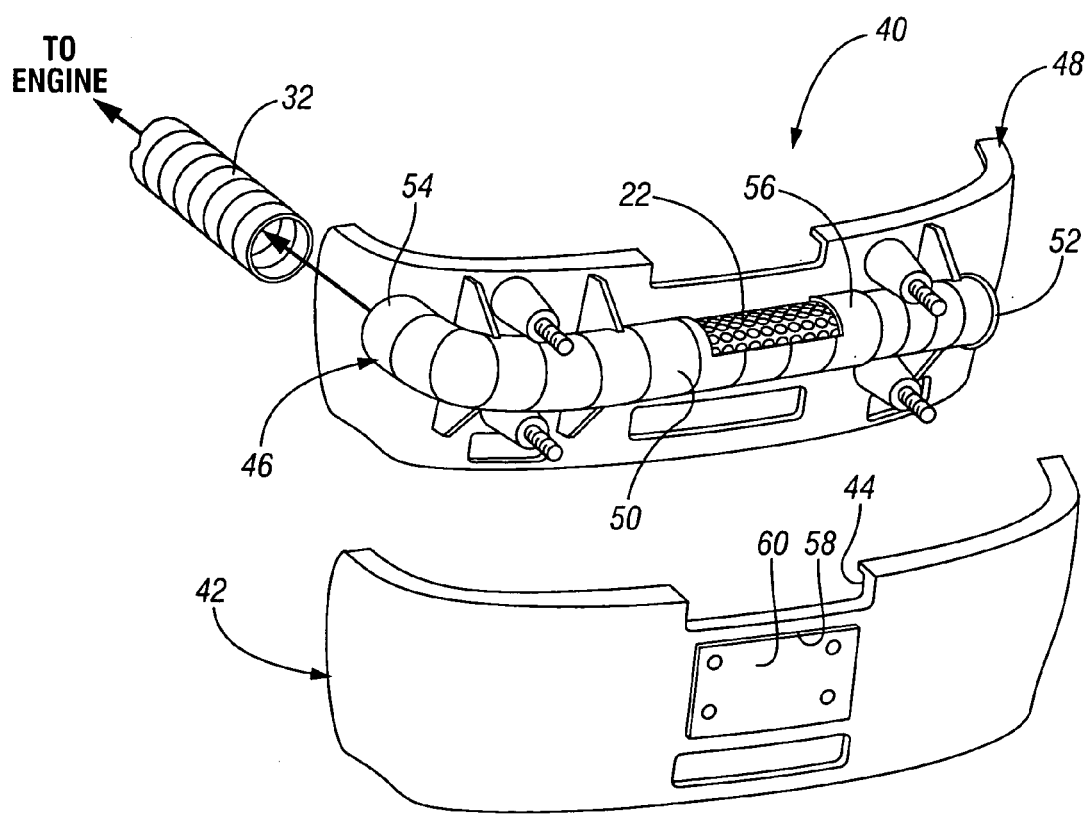
FIG. 4 is a exploded pictorial view of an alternative embodiment of a bumper assembly according to the present invention.

In an alternative embodiment, shown in FIG. 4, a bumper assembly 40 includes an elongated front wall 42 formed of plastic or other suitable materials such as fiberglass, carbon fiber or metal. The front wall 42 has a generally C-shaped cross section internally defining a channel 44 for encasing a portion of an air intake assembly 46. An elongated mounting member 48 having a shape mateable with the elongated front wall 42 is connected with the elongated wall to enclose the interior of the C-shaped cross section. The mounting member 48 is also adapted for mounting the bumper assembly to a vehicle.

The air intake assembly 46 may be mounted to the mounting member 48 or by the interior of the elongated wall 42. The air intake assembly 46 includes an elongated duct 50 having inlet and outlet ends 52, 54 and an intake air filter housing 56 connected intermediate the ends. Housing 56 contains a replaceable filter element 22 for filtering air drawn in through the inlet end and discharged through the outlet end of the duct 50 to an engine air intake 32. The air intake assembly 46 may be harmonically tuned to resonate at a specific frequency to provide resonating sounds for any make or model of vehicle.

If desired, an access opening 58 and access panel 60 may be provided through the elongated front wall 42 of bumper assembly 40 and filter housing 56 of the duct 50 similar to the access opening 34 and access panel 36 illustrated in FIG. 3 to provide access to the air intake assembly 46.

Figure 5:
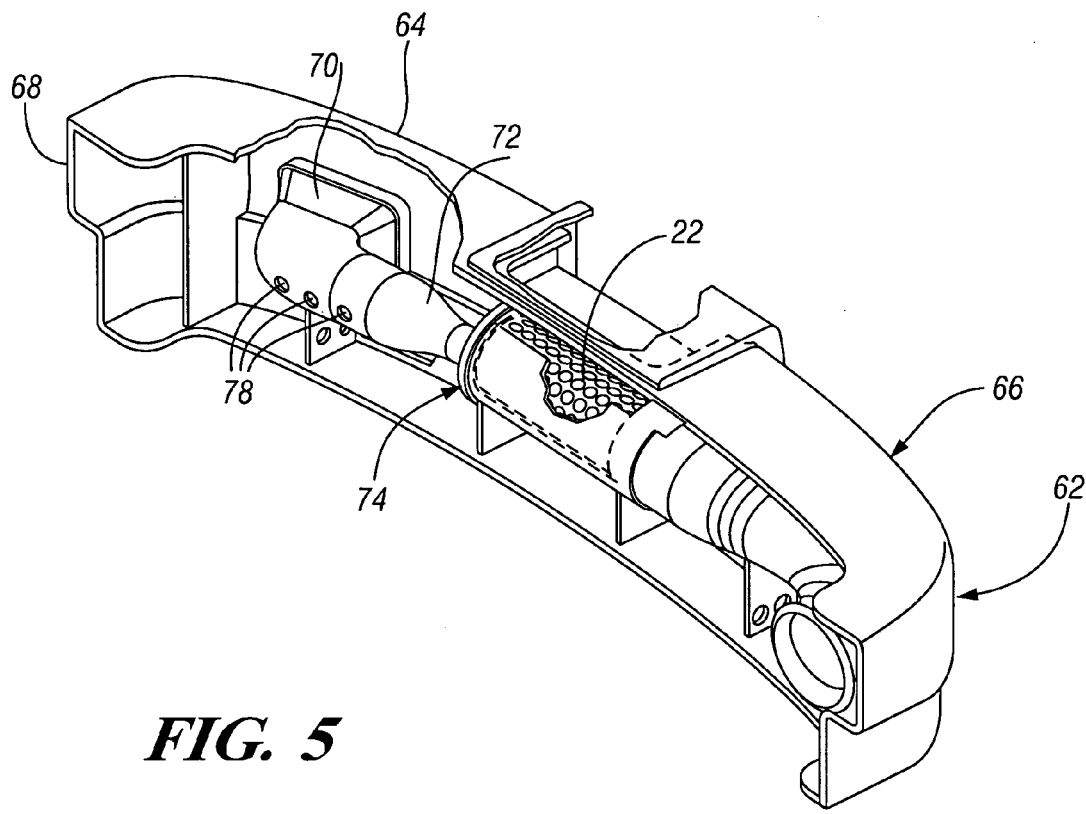
FIG. 5 is a rear pictorial view of an alternative embodiment having a ram-air intake assembly in the bumper assembly.
Figure 6:
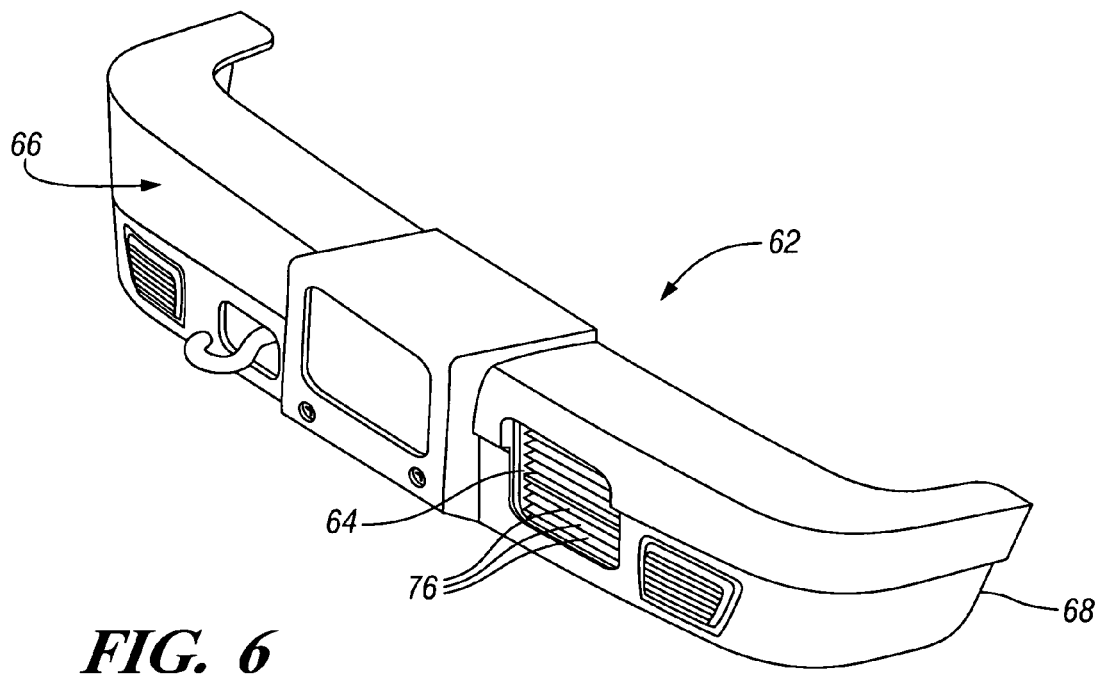
FIG. 6 is a front pictorial view of the embodiment of FIG. 5.

In a modified embodiment, a ram-air inlet may be provided through the elongated walls 12, 42 of either of the previously described bumper assembly embodiments 10, 40 to improve air flow through the air intake assemblies 18, 46. FIGS. 5 and 6 illustrate a bumper assembly 62, similar to bumper assembly 10 as an example wherein a ram-air inlet 64 extends through an elongated front wall 66 of the bumper assembly 62 adjacent a first end 68 of the bumper assembly to connect with an inlet end 70 of a duct 72 of an air intake assembly 74 otherwise similar to air intake assembly 18 of bumper assembly 10. In order to prevent water intrusion into the air intake assembly 74, the inlet 64 is provided with baffles 76 to deflect water and other debris from the inlet 64 of the duct 72. In addition, the duct 72 may be provided with drainage holes 78 before the intake air filter element 22 to limit water intrusion into the air filter and engine. Furthermore, the duct 72 may be provided with baffles, not shown, to direct any water or debris through the drainage holes 78. A screen or prefilter, not shown, may be provided behind the baffles 76 of the ram-air inlet 64 to collect any debris not deflected by the baffles.

Figure 7:
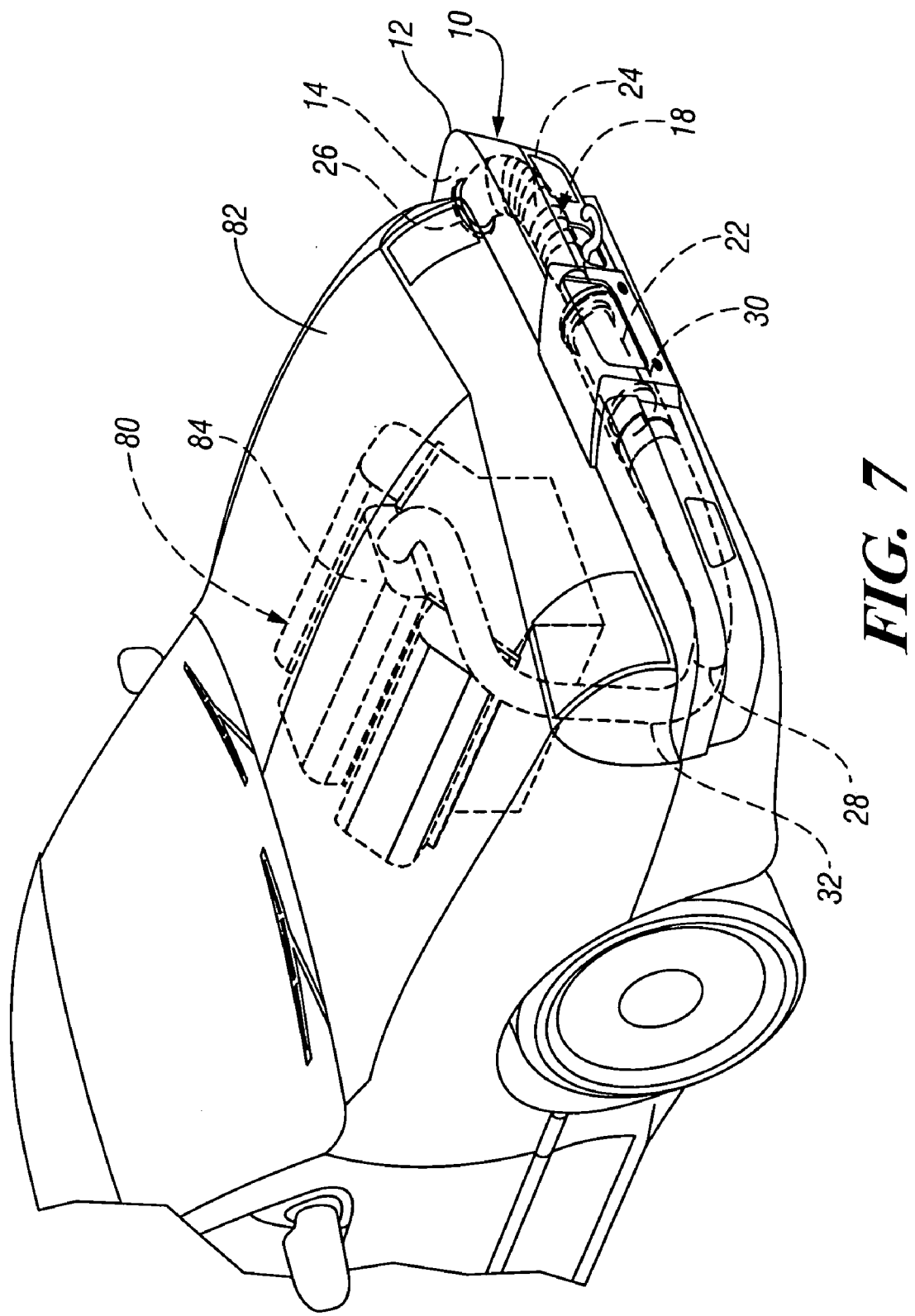
FIG. 7 is a pictorial environmental view showing the vehicle application of a bumper assembly according to the invention.

FIG. 7 illustrates an exemplary installation of bumper assembly 10 on a vehicle. As shown, the air intake assembly 18 within the elongated wall 12 provides filtered inlet air to the vehicle engine 80. In operation, the engine continuously draws air through the air intake assembly 18 from the open side of the channel 14. From the inlet end 26 of the duct, the air flows through the air filter element 22, which captures particulates from the air. The filtered air is then drawn from the outlet end 28 of the duct 24, into the engine air intake 32, which conducts the air through an engine compartment 82 and finally to an engine intake manifold 84.

Bumper assembly 40, when installed, operates in a vehicle in the same manner as bumper assembly 10.

In operation of the embodiment of FIGS. 5 and 6, when the vehicle is in motion, air is forced into the forward facing ram-air inlet 64, increasing the air pressure in the air intake assembly 74 and thereby providing increased airflow through the air intake assembly 74 and the engine. The baffles 76 operate to deflect water and debris from the inlet end 70 of the duct 72 to reduce the amount of water and debris from entering the air intake assembly 74. Any water or debris that enters the inlet end 70 is directed out of the intake assembly 74 through the drainage holes 78 extending through the duct 72 to prevent water from being drawn through the air filter element 22 and subsequently into the engine 80.

Any of the above-described bumper assemblies 10, 40 and 62 may be designed to absorb collision energy. Specifically, the elongated front wall, the air intake assembly and the ribbing within the interior of any of the bumper assemblies may be deformed to absorb energy.

Should the engine air intake 32 become completely blocked through any cause, the engine air intake may be opened or the bumper assembly may be removed to allow temporary operation of the vehicle.

When the air filter element 22 or the intake assembly requires maintenance, the access panel may be opened or removed to allow the air filter or ducting to be cleaned or replaced. After any maintenance work is completed, the access panel is closed or reattached to protect and cover the air intake assembly.

The foregoing description has been directed to embodiments intended for use as front bumpers of vehicles with forward mounted engines. However, the inventive concepts disclosed could also be adapted for use as rear bumpers of vehicles having rear mounted engines without departing from the intended scope of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An automotive bumper assembly for extending laterally across an end of an automotive vehicle, said bumper assembly comprising:
    an elongated wall having a generally C-shaped cross section internally defining a channel; and
    an air intake assembly extending lengthwise in the channel, the intake assembly including an elongated duct having inlet and outlet ends and an intake air filter connected intermediate the ends for filtering air drawn in through the inlet end and discharged through the outlet end to an engine air intake.

2. A bumper assembly as in claim 1 including an access opening extending through the elongated wall and allowing maintenance access to the air filter.

3. A bumper assembly as in claim 2 wherein the air filter is removable through the access opening.

4. A bumper assembly as in claim 2 including an access panel adapted to cover the access opening.

5. A bumper assembly as in claim 4 wherein the access panel has an outward facing surface adapted to hold a license plate.

6. A bumper assembly as in clam 4 wherein the access panel is a door openable for access to the filter.

7. A bumper assembly as in claim 4 wherein the access panel is removable for access to the filter.

8. A bumper assembly as in claim 1 wherein the air intake assembly is harmonically tuned.

9. A bumper assembly as in claim 1 wherein the inlet of the duct is forward facing to receive air from a ram-air inlet extending through the elongated wall to provide ram-air induction to the air intake assembly.

10. A bumper assembly as in claim 9 wherein the ram-air inlet includes baffles operative to limit water intrusion to the air intake assembly.

11. A bumper assembly as in claim 1 wherein the inlet of the duct draws air from an open side of the channel.

12. An automotive bumper assembly for extending laterally across an end of an automotive vehicle, said bumper assembly comprising:
- an elongated wall having a generally C-shaped cross section internally defining a channel;
- an inner mounting member connected with the elongated wall and adapted for mounting the bumper assembly to a vehicle; and
- an air intake assembly extending lengthwise in the channel between the mounting member and the elongated wall, the intake assembly including an elongated duct having inlet and outlet ends and an intake air filter connected intermediate the ends for filtering air drawn in through the inlet end and discharged through the outlet end to an engine air intake.

13. A bumper assembly as in claim 12 including an access opening extending through the elongated wall and allowing maintenance access to the air filter.

14. A bumper assembly as in claim 13 wherein the air filter is removable through the access opening.

15. A bumper assembly as in claim 13 including an access panel adapted to cover the access opening.

16. A bumper assembly as in claim 15 wherein the access panel has an outward facing surface adapted to hold a license plate.

17. A bumper assembly as in claim 15 wherein the access panel is a door openable for access to the filter.

18. A bumper assembly as in claim 15 wherein the access panel is removable for access to the filter.

19. A bumper assembly as in claim 12 wherein the air intake assembly is harmonically tuned.

20. A bumper assembly as in claim 12 wherein the inlet of the duct is forward facing to receive air from a ram-air inlet extending through the elongated wall to provide ram-air induction to the air intake assembly.

21. A bumper assembly as in claim 20 wherein the ram-air inlet includes baffles operative to limit water intrusion to the air intake assembly.

\* \* \* \* \*